(12) United States Patent
Appel et al.

(10) Patent No.: US 11,608,989 B2
(45) Date of Patent: Mar. 21, 2023

(54) CLEANING INSERT FOR REMOVABLE ARRANGEMENT IN A COOKING SPACE OF A COOKING APPLIANCE

(71) Applicant: Wilhelm Bruckbauer, Neubeuern (DE)

(72) Inventors: Nikolaus Appel, Niederndorf (AT);
Philipp Kurz, Niederndorf (AT);
Andreas Weiland, Niederndorf (AT)

(73) Assignee: Wilhelm Bruckbauer, Neubeuern (DE)

( * ) Notice: Subject to any disclaimer, the term of this patent is extended or adjusted under 35 U.S.C. 154(b) by 0 days.

(21) Appl. No.: 17/229,068

(22) Filed: Apr. 13, 2021

(65) Prior Publication Data

US 2021/0317992 A1 Oct. 14, 2021

(30) Foreign Application Priority Data

Apr. 14, 2020 (DE) ...................... 10 2020 204 707.3

(51) Int. Cl.
| | | |
|---|---|---|
| *F24C 14/00* | (2006.01) | |
| *B08B 3/08* | (2006.01) | |
| *B08B 9/08* | (2006.01) | |
| *A47J 27/04* | (2006.01) | |

(52) U.S. Cl.
CPC .............. *F24C 14/005* (2013.01); *B08B 3/08* (2013.01); *B08B 9/08* (2013.01); *A47J 27/04* (2013.01); *A47J 2027/043* (2013.01)

(58) Field of Classification Search
None
See application file for complete search history.

(56) References Cited

U.S. PATENT DOCUMENTS

| | | | |
|---|---|---|---|
| 3,051,559 A | 8/1962 | Brite | |
| 9,976,752 B2 | 5/2018 | Töpfer | |
| 10,767,870 B2 | 9/2020 | Budich | |
| 2010/0072188 A1* | 3/2010 | Lee | F24C 15/005 |
| | | | 219/393 |
| 2016/0341431 A1* | 11/2016 | Topfer | B08B 9/0936 |
| 2018/0299137 A1* | 10/2018 | Budich | F24C 14/005 |
| 2020/0011536 A1* | 1/2020 | Swayne | F24C 15/003 |

FOREIGN PATENT DOCUMENTS

| | | | |
|---|---|---|---|
| DE | 102013021732 A1 | 7/2015 | |
| DE | 102014207558 A1 | 10/2015 | |
| DE | 102015109017 A1 | 12/2016 | |
| EP | 1209419 A2 * | 5/2002 | ............ F24C 14/005 |
| WO | 2015091803 A1 | 6/2015 | |
| WO | 2017025450 A1 | 2/2017 | |

OTHER PUBLICATIONS

EP-1209419-A2 English translation, accessed on Jan. 2022. (Year: 2002).*

DE102014207558 English translation, accessed on Jan. 2022. (Year: 2015).*

* cited by examiner

*Primary Examiner* — Eric W Golightly
*Assistant Examiner* — Arlyn I Rivera-Cordero
(74) *Attorney, Agent, or Firm* — McGlew and Tuttle, P.C.

(57) ABSTRACT

A cleaning insert for removable arrangement in a cooking space of a cooking appliance includes a receiving device for receiving a cleaning unit with a cleaning composition in a reversibly fixed manner, and a supporting body connected to the receiving device for positioning the receiving device relative to the cooking space.

14 Claims, 4 Drawing Sheets

CLEANING INSERT FOR REMOVABLE ARRANGEMENT IN A COOKING SPACE OF A COOKING APPLIANCE

This application claims the priority of German Patent Application, Serial No. 10 2020 204 707.3, filed Apr. 14, 2020, pursuant to 35 U.S.C. 119(a)(d), the contents of which are incorporated herein by reference in their entirety as if fully set forth herein.

FIELD OF THE INVENTION

The invention relates to a cleaning insert for removable arrangement in a cooking space of a cooking appliance. Furthermore, the invention relates to a cleaning unit for a cleaning insert. The invention also relates to a cleaning combination comprising such a cleaning insert and such a cleaning unit. The invention also relates to a method for cleaning a cooking chamber of a cooking appliance.

BACKGROUND OF THE INVENTION

Due to obvious prior use, cooking appliances in the form of steam ovens are known whose cooking chamber can be cleaned using a cleaning composition. For receiving and distributing the cleaning composition in the cooking space, means are configured on one cooking chamber wall which require a lot of installation space, are disruptive during the cooking procedure and are susceptible to the accumulation of stubborn contaminants.

SUMMARY OF THE INVENTION

It is therefore an object of the invention to create an improved cleaning insert which, in particular, enables a particularly thorough cleaning of the cooking space and occupies the available installation space to the smallest possible extent.

This object is achieved by a cleaning insert for removable arrangement in a cooking space of a cooking appliance, having a receiving means for receiving a cleaning unit with a cleaning composition in a reversibly fixed manner, and a supporting body connected to the receiving means, for positioning the receiving means relative to the cooking space. It has been found that a cleaning insert comprising a receiving means for receiving a cleaning unit in a reversibly fixed manner, comprising a cleaning composition and a supporting body connected to the receiving means for positioning the receiving means relative to the cooking space, can be removably arranged in the cooking space, whereby the cooking space is fully maintained in the cooking procedure and whereby the cooking chamber can be cleaned particularly thoroughly. The cooking space is not restricted by means for receiving the cleaning composition. Such means, which are susceptible to contamination during the cooking procedure, can be avoided. In particular, the cleaning insert that can be removed from the cooking space allows the cleaning unit attached to the receiving means to be positioned in a central region of the cooking space. Due to the removability of the cleaning insert, this central region required for the cooking process can be released again after the cleaning process. Arranging the cleaning unit in the central region ensures particularly uniform distribution of the cleaning composition in the cooking space. The cleaning process is thus particularly efficient and energy-saving.

The receiving means is configured as to produce a detachable connection to the cleaning unit. In particular, the receiving means ensures that the cleaning unit can be received without getting lost. For example, the receiving means can be configured as to fully define the position and/or orientation of the cleaning unit relative to the supporting body. The receiving means can be configured so that at least one degree of freedom, in particular exactly one degree of freedom, in particular exactly one degree of rotational freedom, of the cleaning unit relative to the supporting body is open, i.e. unrestricted. The at least one open degree of freedom can allow the cleaning unit to be mounted on the supporting body and/or ensure particularly uniform distribution of the cleaning composition in the cooking space by displacing the cleaning unit relative to the supporting body.

According to one aspect of the invention, the receiving means is configured as to provide a non-formfit and/or formfit connection to the cleaning unit. The supporting body may be configured as to provide a non-positive and/or positive connection to the cooking chamber and/or the cooking chamber door. Preferably, the receiving means is configured as to produce and/or detach the reversible connection to the cleaning unit without tools. The supporting body can be configured as to produce and/or detach the connection to the cooking chamber and/or to the cooking chamber door without tools. The cleaning insert can thus be used particularly easily and efficiently.

According to one aspect of the invention, the supporting body is configured as to attach the receiving means to the cooking chamber and/or to the cooking chamber door in a supported and/or suspended manner Suspended attachment is understood to mean that the center of gravity of the cleaning insert, in particular with the cleaning unit received thereon, is arranged in the vertical direction below a connecting point between the supporting body and the cooking chamber and/or the cooking chamber door. Advantageously, this ensures that the cleaning composition can be distributed particularly evenly in the cooking space, whereby cleaning can be carried out particularly efficiently.

According to one aspect of the invention, the receiving means is arranged in a central region of the carrier for the food to be cooked. Preferably, in a top view, in particular with the supporting body positioned in the cooking space as intended, the receiving means is arranged in a central region of the cleaning insert, in particular of the supporting body, in particular of the carrier for the food to be cooked, and/or of the cooking chamber. In the top view, a distance between the receiving means and an outer contour of the supporting body is preferably at least 50 mm, in particular at least 100 mm Preferably, the geometric center of the area of the cleaning insert, in particular of the supporting body, and/or of the cooking chamber lies within an outer contour of the receiving means in the top view. Advantageously, this ensures that the cleaning composition can be distributed at a central position of the cooking space and thus particularly uniformly throughout the cooking space.

The receiving means can be arranged, in particular along a main plane of extension of the carrier for the food to be cooked, at a distance from the central region, in particular from a geometric center of the area of the supporting body. For example, a distance between the geometric center of the area of the supporting body, in particular along the main extension plane of the supporting body, and a geometric center of the area of the receiving means or an outline of the receiving means is at least 10 mm, in particular at least 20 mm, in particular at least 50 mm, in particular at least 100 mm The distance may be measured in the main extension plane of the supporting body, in particular along a transverse direction and/or a depth direction of the cooking space. Advantageously, an eccentric arrangement of the receiving means on the supporting body ensures that the cleaning unit can be positioned in a region of the cooking space in which the distribution of the cleaning composition can be carried out even more efficiently. In this region, for example, there is an increased air, steam or water throughput compared to the rest of the cooking space. The cleaning composition can thus be distributed and spread in the cooking space in a particularly efficient manner.

According to one further aspect of the invention, the cooking appliance is configured as an oven, in particular as a baking oven and/or as a steam cooking oven. The cooking appliance preferably has a temperature regulation means for regulating the temperature in the cooking space, in particular by heating, and/or via an automated water and/or steam supply.

For receiving the cleaning unit in a loss-proof manner, the receiving means may have a reversibly displaceable locking element. Preferably, the cleaning unit cannot be removed from the cleaning insert, in particular the receiving means, without displacing the locking element from a locked position to a release position. For example, the locking element can be configured as a locking latch.

Preferably, the supporting body has at least 3, in particular at least 4, adjustable feet for positioning the cleaning insert on a positioning surface, in particular a positioning plane.

According to another aspect of the invention, the supporting body has a carrier for the food to be cooked. The carrier for the food to be cooked may be configured as to receive cooking utensils, in particular pots and/or roasters and/or pans. The carrier for the food to be cooked may also be configured for receiving the food to be heated, in particular as a roasting spit. Preferably, the supporting body has a function supporting the cooking process. Advantageously, this allows the cleaning insert to replace a device that is required in the kitchen anyway. The requirement for additional storage space for the cleaning insert can thus be avoided.

According to another aspect of the invention, the carrier for the food to be cooked has a baking rack. Preferably, the carrier for the food to be cooked is a baking rack. The baking rack may comprise a plurality of rack bars. Preferably, the rack bars configure a rack frame and a positioning surface for placing the food to be cooked. A baking rack is a device that is usually required in the kitchen anyway. By configuring the carrier for the food to be cooked as a baking rack, no additional storage space is required in the kitchen for storing the cleaning insert.

The carrier for the food to be cooked can alternatively be configured as a perforated plate and/or a baking tray.

According to one further aspect of the invention, the receiving means is configured by at least one bar of the baking rack. Preferably, the receiving means is configured by at least two rack bars, in particular exactly two rack bars. The at least one rack bar may be configured for abutting, in particular in a rotatable manner, on the cleaning unit. For example, the at least one rack bar is configured at least in sections as a circular arc for this purpose.

According to one further aspect of the invention, the supporting body has a rail engagement for being connected to a supporting rail of the cooking appliance. The supporting rail of the cooking appliance is preferably rails, in particular arranged in pairs on opposite side walls of the cooking chamber, for receiving a baking rack and/or a baking tray.

According to one further aspect of the invention, the receiving means has a formfit element for a formfit connection to the cleaning unit. Preferably, the receiving means is configured as to form a bayonet lock and/or a snap-in connection and/or a latch connection with the cleaning unit. This ensures a particularly reliable connection, in particular one that can be detached without tools, between the cleaning unit and the receiving means.

Preferably, the cleaning insert is a baking rack with a receiving means for arranging a cleaning unit in a fixable manner, in particular for the formfit connection to the cleaning unit, in particular in the form of a bayonet lock.

One further object of the invention is to provide an improved cleaning unit which in particular is especially easy to handle and ensures uniform distribution of the cleaning composition in the cooking chamber.

This object is achieved by a cleaning unit for a cleaning insert as described above. The cleaning unit can have a cleaning composition, a chamber in which the cleaning composition is arranged with a dispensing opening for dispensing the cleaning composition into the cooking space, and a counter-receiving means for reversibly fixed attachment to the cleaning insert. The counter-receiving means can be configured for being connected, in particular reversibly and/or without tools, to the receiving means of the cleaning insert.

The chamber preferably comprises a temperature-resistant, in particular up to at least 100° C., in particular up to at least 150° C., in particular up to at least 200° C., in particular up to at least 250° C., and/or water-insoluble material. The chamber may also be made of a water-soluble and/or meltable material, in particular meltable at temperatures of at most 200° C., in particular at most 150° C., in particular at most 100° C. The chamber can also be made of a compostable material. Preferably, the chamber comprises at least one of the following materials: plastic, in particular polypropylene and/or polycarbonate and/or polyethylene and/or acrylic butadiene styrene and/or a biopolymer, in particular polylactic acid.

The chamber preferably has exactly one, in particular at least one, in particular at least two dispensing openings. A chamber configured with two dispensing openings can be flushed with purging liquid for particularly efficient distribution of the cleaning composition. For this purpose, a line connection for the connection to a water line can be arranged at at least one of the dispensing openings.

The cleaning composition preferably comprises at least one, in particular at least two, especially at least three, cleaning ingredients. The cleaning ingredients may be mixed together or may be present separately in the chamber. Preferably, the at least two cleaning ingredients are separated by at least one sealing layer. Preferably, the chamber is divided by the at least one sealing layer into at least two partial chambers separated from each other. A further sealing layer can be arranged between the dispensing opening and the cleaning composition or at the dispensing opening. Advantageously, this ensures that the cleaning composition is securely enclosed in the chamber until it is used.

The cleaning composition may comprise liquid and/or solid, in particular powdery and/or granular cleaning ingredients. Preferably, the cleaning composition comprises at least one of the following cleaning ingredients: Sodium carbonate, sodium percarbonate, citric acid. Preferably, the cleaning composition comprises 160 g of powdered sodium carbonate and 60 g of powdered citric acid.

The at least one sealing layer is preferably configured as a melting layer, with a melting temperature of at most 250° C., in particular at most 200° C., in particular at most 150° C., in particular at most 100° C., and/or as a water-soluble layer. Particularly preferably, several sealing layers each have different melting temperatures. For example, a first sealing layer may have a melting temperature of 65° C. and a second sealing layer may have a melting temperature of 95° C. Preferably, the sealing layer is a plastic layer and/or a wax layer. The dispensing of the cleaning composition can thus be performed particularly easily in a temperature-controlled manner and/or controlled by a liquid supply.

Preferably, the plurality of partial chambers is configured in series in the chamber starting from the dispensing opening. The sealing layers preferably have a melting temperature that increases starting from the dispensing opening. The cleaning ingredients can thus be discharged from the cleaning unit in succession in a temperature-controlled manner.

According to one further aspect of the invention, the counter-receiving means has a counter-formfit-locking element for the formfit connection to the cleaning insert. The counter receiving means can have exactly one, in particular at least one, in particular at least two, counter-formfit-locking elements. The at least one counter-formfit-locking element is preferably a component of a bayonet lock and/or a snap-in connection and/or a latch connection. The counter-receiving means may be configured as to connect to the receiving means formed by the at least one rack bar. In particular, the receiving means may have an undercut for receiving the at least one rack bar. The cleaning unit can thus be connected to the cleaning insert in a particularly reliable, in particular loss-proof, manner.

According to one further aspect of the invention, the counter-receiving means is connected integrally to the chamber. For example, the counter-receiving means may be materially bonded to the chamber. The counter-receiving means and the chamber may be produced in an injection molding process, in particular in one single process step. The chamber and the counter-receiving means preferably have the same material. The cleaning unit can thus be manufactured particularly efficiently and economically.

Another object of the invention is to provide an improved cleaning combination for a cooking appliance.

This object is achieved by a cleaning combination for a cooking appliance, having a cleaning insert and a cleaning unit as described above. The advantages of the cleaning combination correspond to the advantages of the cleaning insert and the cleaning unit described above. In particular, the cleaning combination can be further developed with the features described above with respect to the cleaning insert and/or the cleaning unit. The cleaning combination may be configured for removable arrangement in the cooking space of the cooking appliance.

Preferably, the cleaning unit is reversibly attached to the receiving means of the cleaning insert via the counter-receiving means. The cleaning unit can be connected to the cleaning insert without tools and/or be detached from the latter without tools.

According to one aspect of the invention, the cleaning unit attached to the cleaning insert penetrates the supporting body. Preferably, a main extension direction of the cleaning unit attached to the cleaning insert is configured to be perpendicular to a main extension plane of the cleaning insert. The receiving means may have a receiving opening through which the cleaning unit penetrates the supporting body. Preferably, the receiving means is configured by a boundary of the receiving opening. The cleaning insert can thus be configured to be particularly compact.

According to one further aspect of the invention, the cleaning unit is arranged on the cleaning insert such that the cleaning composition can be dispensed from the chamber by gravity through the dispensing opening. The cleaning combination is thereby preferably arranged in the cooking chamber. The dispensing opening is preferably located at the bottom of the cleaning unit. In particular, the dispensing opening opens the chamber downward. The cleaning composition can thus fall out of the chamber purely by gravity. In particular, the chamber in the position inserted into the cooking chamber does not form any liquid reservoir for taking up purging liquid. Purging liquid entering the chamber can therefore drain off again completely.

One further object of the invention is to provide an improved method for cleaning a cooking chamber of a cooking appliance, which is particularly easy to perform and efficient.

This object is achieved by a method for cleaning a cooking chamber of a cooking appliance, comprising the steps: providing a cleaning combination as described above, connecting the cleaning unit to the cleaning insert by attaching the counter-receiving means to the receiving means, positioning the cleaning insert with the cleaning unit in the cooking space, dispensing the cleaning composition from the dispensing opening into the cooking space for cleaning the cooking chamber, and removing the cleaning insert with the chamber from the cooking space. The advantages of the method correspond to the advantages described above with respect to the cleaning combination, the cleaning insert and the cleaning unit. The method can be further developed with the features described above with respect to the cleaning combination and/or the cleaning insert and/or the cleaning unit.

Preferably, water, in particular liquid and/or in the form of vapor, is circulated through the cooking space. In particular, the circulation of water is performed via a pipe located outside the cooking chamber, in particular through a drain opening of the cooking chamber. The drain opening is preferably arranged at the bottom of the cooking chamber. Due to the circulation of the water, the cleaning process is particularly gentle on the environment and resources.

Preferably, fresh water is circulated through the cooking space before the cleaning composition is dispensed. This pre-purging phase is preferably performed over a period in a range between 5 min to 20 min, in particular over a period of 10 min. The dirty fresh water can be pumped out. Preferably, fresh water is fed into the cooking space several times and pumped out again as dirty purging water. During this process, the cooking space can be heated to a temperature in a range from 30° C. to 60° C., in particular to 50° C.

In a purging phase, the cleaning composition, in particular the first cleaning ingredient, in particular comprising sodium carbonate, can be discharged from the chamber into the cooking space. Preferably, fresh water is supplied to the cooking space. The fresh water can mix with the first cleaning ingredient. Preferably, a cleaning liquor is formed. Preferably, the cleaning liquor is circulated several times through the cooking chamber. In this process, stubborn dirt comes loose from the cooking chamber wall. Preferably, during this process, the cooking space is regulated and/or heated to a purging temperature in a range of 30° C. to 80° C., in particular of 50° C. to 70° C., in particular to 65° C. The purging phase preferably has a duration in the range of 30 min to 120 min, in particular of 40 min to 90 min, in particular of 60 min.

According to one aspect of the invention, in particular after the purging phase, fresh water is circulated through the cooking space. This intermediate purging phase substantially corresponds to the pre-purging phase. Preferably, the temperature of the cooking space remains unchanged compared to the temperature in the purging phase. The temperature can also be lower than in the purging phase, in particular decreasing successively. Preferably, the process of supplying fresh water, circulating it through the cooking space and pumping off the dirty water is performed at least twice, in particular at least three times, in succession.

Preferably, in particular after the purging phase and/or after the intermediate purging phase, the second cleaning ingredient, in particular comprising citric acid, is dispensed into the cooking chamber. The cooking space is preferably heated to a temperature of at least 60° C., in particular to at least 80° C., in particular to at least 90° C., in particular to 95° C. The temperature is preferably higher than the temperature in the purging phase. Water can be circulated through the cooking space. Preferably, a descaling solution is formed when the water is mixed with the second cleaning ingredient. Preferably, the descaling solution is circulated through the cooking space several times. Afterwards, the descaling solution can be pumped off. This decalcification phase preferably lasts 10 min to 30 min, in particular 20 min.

Further cleaning ingredients can be released from the chamber into the cooking space one after the other.

A post-purging phase, which is preferably carried out after the purging phase, in particular after the decalcification phase, essentially corresponds to the pre-purging phase and the intermediate purging phase. The temperature of the cooking space during the post-purging phase can correspond to the temperature of the cooking space during the decalcification phase. The temperature may also be lower, in particular decreasing successively.

The cooking appliance may have a control device for automated execution of the cleaning process.

According to one further aspect of the invention, at least one sealing layer is opened by temperature to release the cleaning composition. The sealing layer can be melted in this process. Alternatively, a bond, in particular an adhesive bond, between the sealing layer and the chamber may be melted. Preferably, a temperature-induced opening of two sealing layers of the cleaning unit is performed to release two different cleaning ingredients of the cleaning composition at different activation temperatures in each case.

Advantageously, this allows different cleaning ingredients, in particular with different functions, in particular with different pH values, to be released into the cooking space in an automated controlled manner.

As an alternative to the temperature-induced opening of the at least one sealing layer, the sealing layer or the chamber wall can be dissolved in water, in particular in sections or completely, and thus have the effect of releasing the cleaning composition into the cooking space.

Preferably, the purging water and/or the fresh water is discharged into the cooking space via a fan wheel for circulating the air in the cooking space, in particular a recirculating air wheel. Preferably, the liquid is discharged onto the rotating fan wheel for even distribution in the cooking space.

According to one further aspect of the invention, the counter receiving means of the cleaning unit can be arranged in the cooking space of the cooking appliance by means of at least one, preferably by means of at least two fastening means, such as hooks, eyelets, grooves, for example. The counter-receiving means of the cleaning unit can also itself have corresponding fastening means or be designed as a corresponding fastening means.

According to an alternative, the cleaning unit can be arranged in the cooking space on a suitable fastening device by means of appropriate fastening means.

One further object of the invention is to provide an improved cleaning unit.

This object is achieved by a cleaning unit which has at least one soluble cleaning composition. The cleaning unit can in particular be completely soluble. Soluble configuration is in particular understood to mean that the cleaning unit is soluble in water or a cleaning liquid, if necessary in the case of heat.

According to one further aspect of the invention, the cleaning unit comprises as portions a selection of one or more alkaline solutions, acids or rather one of their salts, and water. The proportion of alkali solutions may be in the range of 30 ml to 70 ml, in particular in the range of 40 ml to 60 ml.

The proportion of acid may be in the range of 15 ml to 55 ml, in particular in the range of 25 ml to 45 ml, in particular in the range of 30 ml to 40 ml.

The proportion of water may in particular be in the range of 0 ml to 50 ml, in particular in the range of 5 ml to 30 ml, in particular at most 15 ml.

According to one further aspect of the invention, the cleaning unit is designed in the form of a tab. According to one further aspect of the invention, the cleaning unit is formed in a spherical shape. The cleaning unit can in particular be designed as a pressed body. It can in particular be flexibly pressed into different shapes. By shaping the cleaning unit, on the one hand, its arrangement in the cooking space, in particular on the receiving means or on the supporting body, and on the other hand, the process of the cleaning process, in particular the sequence of different cleaning phases in which different components of the cleaning composition of the cleaning unit are dissolved, can be influenced. According to one further aspect of the invention, the cleaning unit is formed in a spherical shape with an extension. The extension may serve to fix the cleaning unit to the supporting body. In particular, it may be formed for formfit connection to the formfitting element. Other shapes are also possible.

According to one further aspect of the invention, the cleaning unit is soluble without any residue. The cleaning unit may in particular be free of plastic and/or wax. Hereby, undesirable residues in the cooking space or other areas of the cooking appliance can be avoided. In addition, waste is avoided.

According to one further aspect of the invention, the cleaning unit comprises of the components acid and alkali solution. In particular, this also includes corresponding salts.

According to one further aspect of the invention, the cleaning unit comprises a first wax layer. The first wax layer may serve to protect the cleaning unit. In particular, it may enclose the cleaning composition. This may provide protection against accidental dissolution of the cleaning unit.

The first wax layer can also serve to separate the different components of the cleaning composition. In particular, it may serve to separate an inner region of the cleaning unit from an outer region of the cleaning unit.

In particular, the first wax layer can serve to separate a region containing an acid or rather its salt and a region containing an alkali or its salt.

According to one further aspect, the first wax layer has a melting point in the range of 50° C. to 90° C., in particular in the range of 60° C. to 70° C. or in the range of 80° C. to 90° C.

According to one further aspect of the invention, the cleaning unit comprises a first wax layer and a second wax layer. The first wax layer is separate from the second wax layer. In particular, the first wax layer may form an outer wax layer. The second wax layer may in particular form an inner wax layer for separating different components of the cleaning composition.

According to one further aspect of the invention, the second wax layer has a higher melting point than the first wax layer. In particular, the melting point of the first wax layer may differ from the melting point of the second wax layer by at least 5° C., in particular at least 10° C., in particular at least 20° C. The first wax layer and the second wax layer can also be made of the same material. In particular, they may have an identical melting point. In particular, the melting point of the first wax layer may deviate from the melting point of the second wax layer by at most 10° C., in particular at most 5° C. Due to the different melting points of the first wax layer and the second wax layer, it is possible in a simple manner to achieve that in a first section of the cleaning process only the wax layer with the lower melting point, in particular the outer wax layer, melts and thus releases a component of the cleaning composition, in particular the alkali for solution. The second component of the cleaning composition, in particular the acid-based component, which is surrounded by the second wax layer with the higher melting point, in particular the inner wax layer, can initially be enclosed by the second wax layer and thus be protected against dissolution and only be dissolved at a later stage of the process after melting of the second wax layer.

According to one further aspect of the invention, the second wax layer of the cleaning unit is configured to be arranged completely within an area surrounded by the first wax layer. In particular, the second wax layer is spaced from the first wax layer. In particular, it can be arranged equidistantly to the first wax layer.

According to one further aspect of the invention, the first wax layer of the cleaning unit is arranged concentrically to the second wax layer.

According to one further aspect of the invention, the first wax layer of the cleaning unit comprises a proportion of alkali. According to a further aspect of the invention, the second wax layer of the cleaning unit comprises a proportion of acid.

According to one further aspect of the invention, the alkali may be arranged outside the second wax layer and inside the first wax layer.

Instead of the wax layers, other protective covers surrounding the components of the cleaning composition can also be provided. Preferably, the protective covers are designed in such a way that they do not release the constituent of the cleaning composition enclosed by them until a predetermined temperature, for example their melting point, is exceeded and/or until a predetermined process duration has elapsed.

Preferably, the covers surrounding the components of the cleaning composition are themselves water-soluble and/or liquefiable. This facilitates residue-free cleaning of the cooking space. According to an alternative, the cleaning unit can have different, separate subunits. In particular, it is possible to form a first sub-unit with an alkali-based component of the cleaning composition. In particular, it is possible to form a second sub-unit with an acid-based component of the cleaning composition. By providing an enclosure of one or all of the partial components of the cleaning unit with a cover completely surrounding the partial component of the cleaning composition, it can be achieved that the corresponding part of the cleaning composition is only released, in particular dissolved, when a certain temperature is exceeded and/or after a predetermined exposure time. In this way, the process of the cleaning process can be influenced, in particular controlled, in a simple manner.

According to one further aspect of the invention, the cleaning unit is formed with a counter receiving means so that the cleaning unit can be arranged, in particular fixed, on the carrier for the food to be cooked.

The previously described aspects of the design of the cleaning unit form independent aspects of the invention. They can lead to advantages independently of the other aspects of the invention. They can also be combined with other aspects of the invention.

Further advantages, features and details of the invention will be apparent from the following description of an exemplary embodiment based on the figures.

DESCRIPTION OF THE PREFERRED EMBODIMENT

Figure 1:
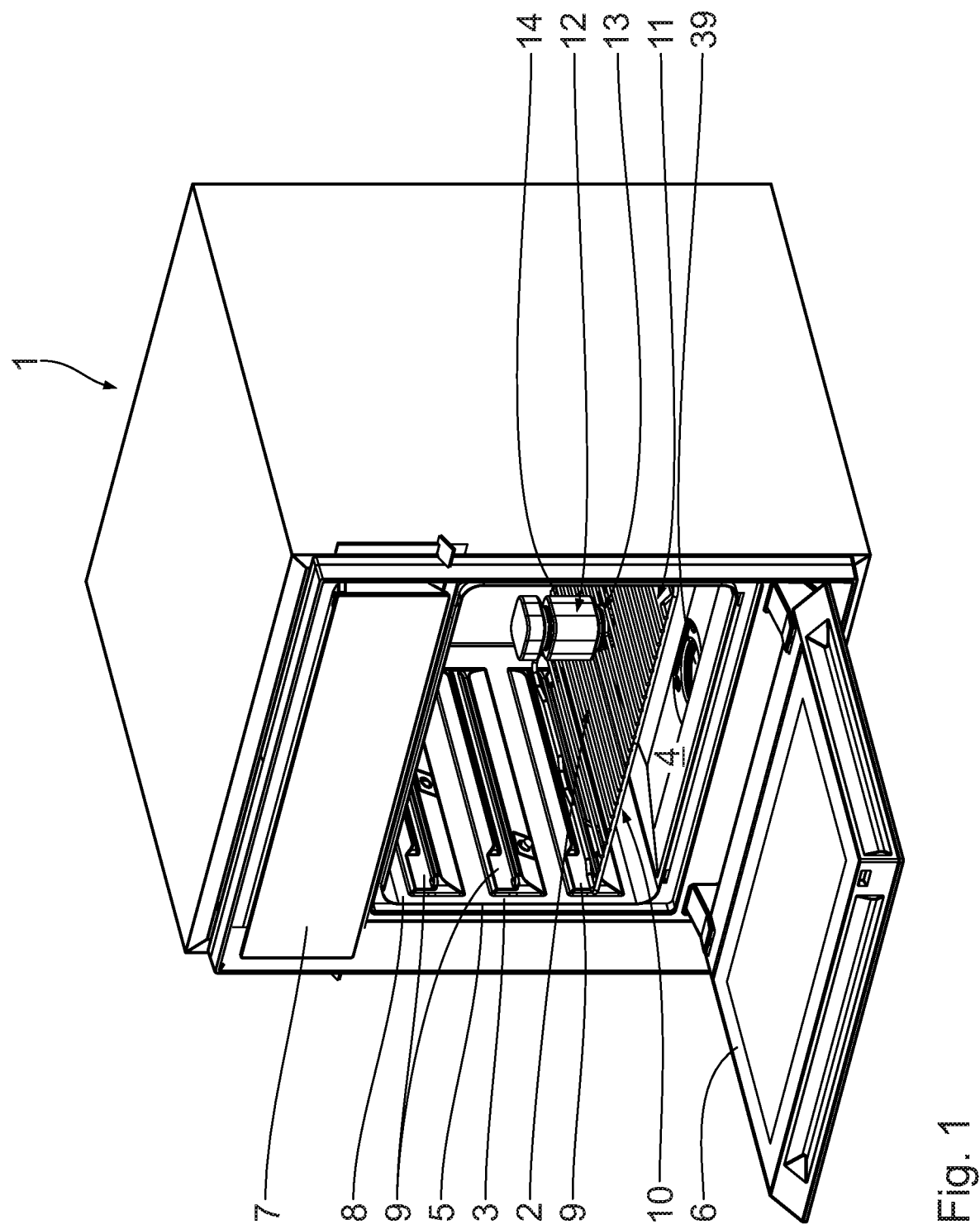
FIG. 1 shows a perspective view of a cooking appliance for heating food in the form of a steam oven with a cleaning combination for reversible insertion into a cooking space of the cooking appliance.

On the basis of FIG. 1 to FIG. 4, a cooking appliance 1 for heating food to be cooked with a cleaning combination 2 removably arranged therein is described. The cooking appliance 1 is configured as a steam cooking oven and comprises a cooking chamber 3 for receiving the food to be heated. The cooking chamber 3 bounds a cooking space 4 and includes a cooking chamber opening 5 for loading and unloading the food to be cooked. The cooking chamber opening 5 can be reversibly closed by means of a cooking chamber door 6.

The cooking appliance 1 comprises a control device, not shown, for controlling the cooking process and a method for cleaning the cooking space 4. The control device is in signal connection with a user interface 7. The user interface 7 comprises a touch-sensitive screen for entering control commands and for visually outputting information, in particular about the cooking and cleaning process. The cooking chamber 3 comprises two side walls 8, a bottom wall, a rear wall and a top wall. Three supporting rails 9 are arranged opposite to one other in pairs on each of the side walls 8. The supporting rails 9 are configured to receive a carrier 10 for food to be cooked in a supported manner.

The cleaning combination 2 removably arranged in the cooking space 4 comprises a cleaning insert 11 and a cleaning unit 12 attached thereto. The cleaning insert 11 comprises a receiving means 13 for receiving the cleaning unit 12 in a reversibly fixed manner and a supporting body 14 connected to the receiving means 13 for positioning the receiving means 13 relative to the cooking space 4.

The supporting body 14 comprises the carrier 10 for the food to be cooked. The carrier 10 for the food to be cooked is configured as a baking rack. The cleaning insert 11, in particular the supporting body 14, has adjustable feet for positioning the receiving means 13. The adjustable feet 15 are preferably configured to ensure an arrangement of the receiving means 13 at a distance from the positioning surface. The cleaning unit 12 can thus be connected to the cleaning insert 11 in a particularly simple manner when the cleaning insert 11 is placed on a storage area, such as a kitchen worktop.

The carrier 10 for the food to be cooked has a rail engagement 16 for connecting the cleaning insert 11 to the supporting rails 9. The carrier 10 for the food to be cooked comprises a plurality of rack bars 17. The rack bars 17 configure a circumferential rack frame 18. Several other rack bars 17, which are oriented parallel to one another at least in sections, configure a positioning surface 19 for supporting the food to be cooked. The rack frame 18 configures the rail engagement 16.

The receiving means 13 is arranged in a central region of the cleaning insert 11, in particular of the carrier 10 for the food to be cooked. In particular, a smallest convex envelope of the receiving means 13 overlaps the geometric center of the area of the cleaning insert 11, in particular of the carrier 10 for the food to be cooked, in a top view. Alternatively, the receiving means 13 can be arranged in an eccentric position relative to the central region of the cleaning insert 11, in particular of the carrier 10 for the food to be cooked.

The receiving means 13 is formed by two of the rack bars 17. These rack bars 17 configure formfit elements 21 for formfittingly connecting the cleaning unit 12 to the supporting body 14.

The receiving means 13 comprises a receiving opening 22. The receiving opening 22 penetrates the carrier 10 for the food to be cooked in a direction perpendicular to the positioning surface 19. The receiving opening 22 is bounded by the rack bars 17 configuring the formfit elements 21. In a top view, in particular perpendicular to the positioning surface 19, the receiving opening 22 is configured in the form of a circle with two legs 23 joined thereto. The legs 23 are oriented in a parallel direction to each other. With respect to the circular portion 24 of the receiving opening 22, the two legs 23 extend radially and diametrically opposite to one another. For this purpose, the rack bars 17 configuring the formfit elements 21 each comprise a central, circular-arc-shaped bar portion 25 and two straight bar portions 26 extending therefrom and being parallel to one another. The rack bars 17 configured as formfit elements 21 extend in the same plane, in particular in a plane parallel to the positioning surface 19.

A diameter of the circular portion 24 of the receiving opening 22 is preferably in a range of 20 mm to 100 mm, in particular of 25 mm to 80 mm, in particular of 30 mm to 60 mm, in particular of 40 mm to 50 mm Preferably, the diameter D is 45 mm A width B of the legs 23 is 18 mm. The width B is determined by the distance of the straight, mutually parallel bar portions 26 between the two rack bars 17 configuring the receiving means 13.

The cleaning unit 12 is attached to the receiving means 13. The cleaning unit 12 comprises a chamber 27 in which a cleaning composition 28, 29 is arranged. The cleaning composition comprises a first cleaning ingredient 28 and a second cleaning ingredient 29. The two ingredients 28, 29 of the cleaning composition are arranged in the chamber 27 separated from each other by a second sealing layer 30. The chamber 27 has a dispensing opening 31 via which the cleaning composition 28, 29 can be dispensed into the cooking space 4. A first sealing layer 32 is arranged between the dispensing opening 31 and the cleaning composition 28, 29. The sealing layer 32 is preferably located at the level of the abutment collar 37. A main extension plane of the sealing layers 32 is preferably arranged perpendicular to an axis of rotation 36 of the cleaning unit 12. By means of the first sealing layer 32, the cleaning composition 28, 29 is enclosed in the chamber 27 in a loss-proof manner.

The chamber 27 is made of a plastic material, in particular polypropylene. The first ingredient 28 comprises sodium carbonate. The second ingredient 29 comprises citric acid. Both cleaning ingredients 28, 29 are present in the form of fine granules.

The sealing layers 30, 32 comprise a meltable material. The first sealing layer 32 consists of a wax with a melting temperature of 60° C. The second sealing layer 30 is composed of a wax having a melting temperature of 90° C.

The cleaning unit 12 comprises a counter-receiving means 33 for reversibly fixing the cleaning unit 12 to the cleaning insert 11. The counter-receiving means 33 has two counter-formfit-locking elements 34 for a formfit connection to the formfit elements 21 of the cleaning insert 11. The counter-formfit-locking elements 34 are configured as projections which protrude radially from an otherwise cylindrical connecting portion 35 of the cleaning unit 12. An abutment collar 37 arranged on the cylindrical connecting portion 35 is configured to be rotationally symmetrical with respect to an axis of rotation 36 of the cleaning unit 12. A rotary engagement 38 is configured between the counter-formfit-locking elements 34 and the abutment collar 37. The rotary engagement 38 configures a rotationally symmetrical undercut between the abutment collar 37 and the counter-formfit-locking elements 34 along the axis of rotation 36.

The counter-receiving means 33, in particular the counter-formfit-locking elements 34, are integrally connected, in particular materially bonded, to the chamber 27. The counter-receiving means 33 and the chamber 27 are produced in an injection molding process, in particular in one single process step. A width b of the counter-formfit-locking elements 34 of the cleaning unit 12 is 16 mm and is thus smaller than the width B of the legs 23 of the cleaning insert 11, in particular of the receiving means 13.

Figure 2:
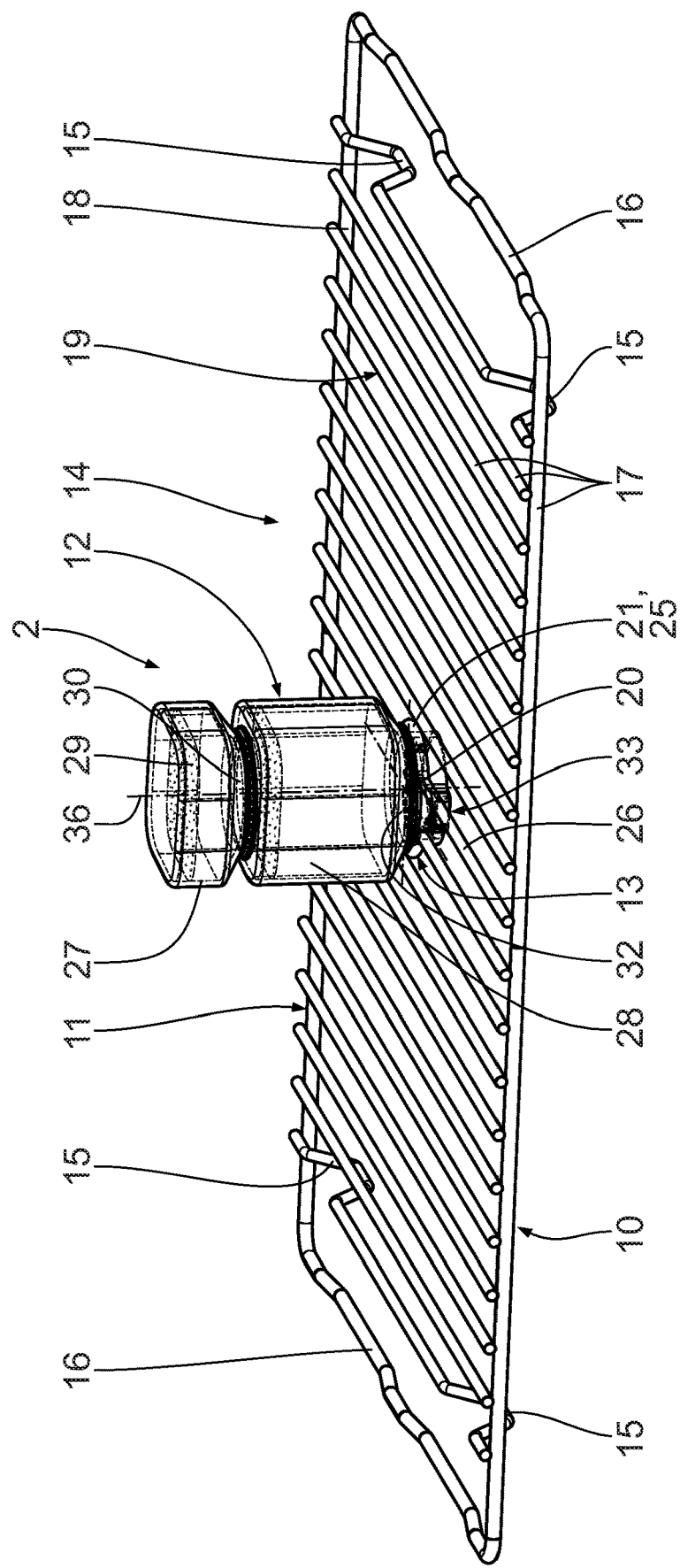
FIG. 2 shows a perspective view of the cleaning combination in FIG. 1 from diagonally above, with a cleaning insert and a cleaning unit attached to same.
Figure 3:
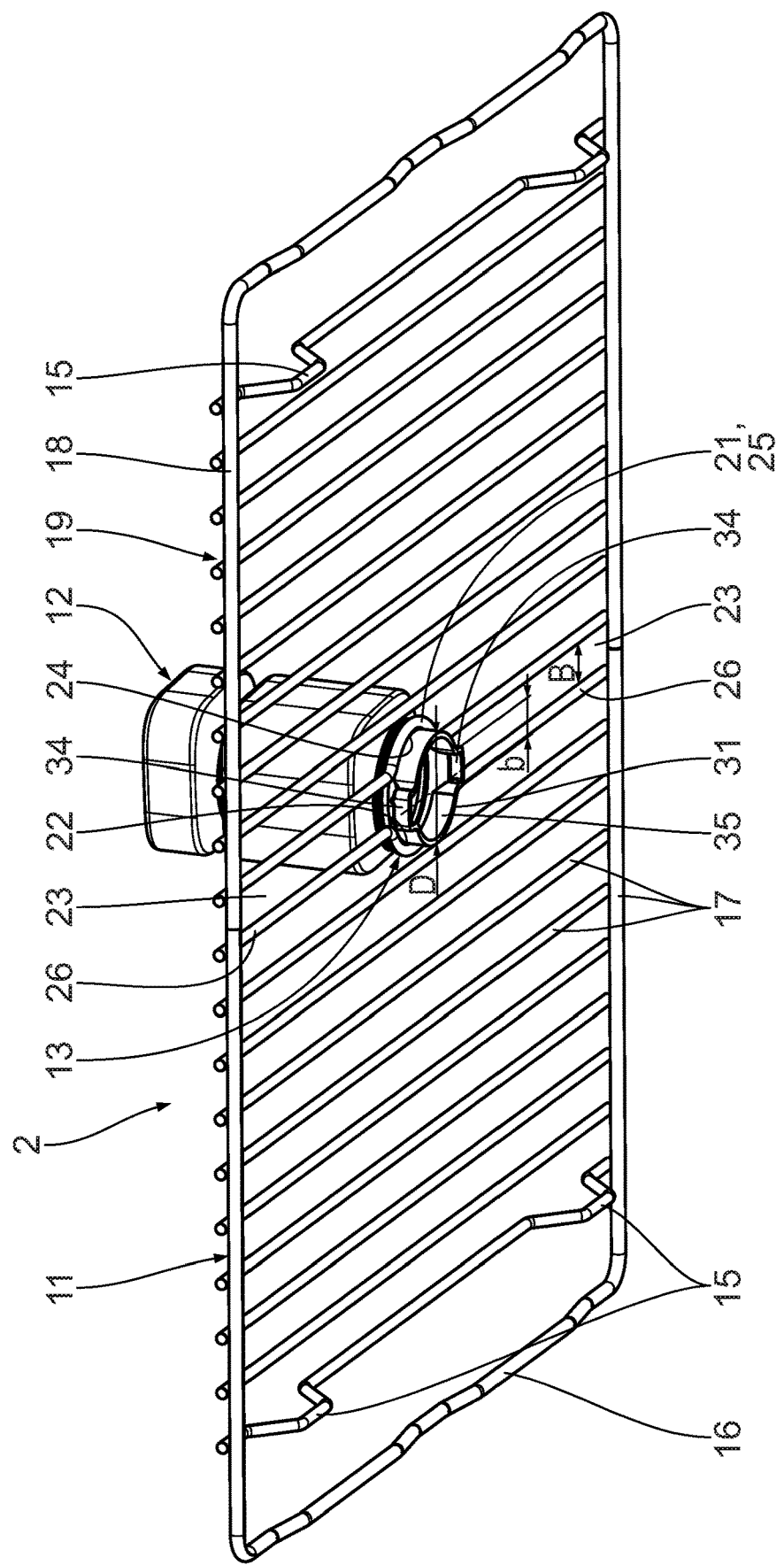
FIG. 3 shows a perspective view of the cleaning combination in FIG. 1 from diagonally below with the cleaning insert and the cleaning unit.
Figure 4:
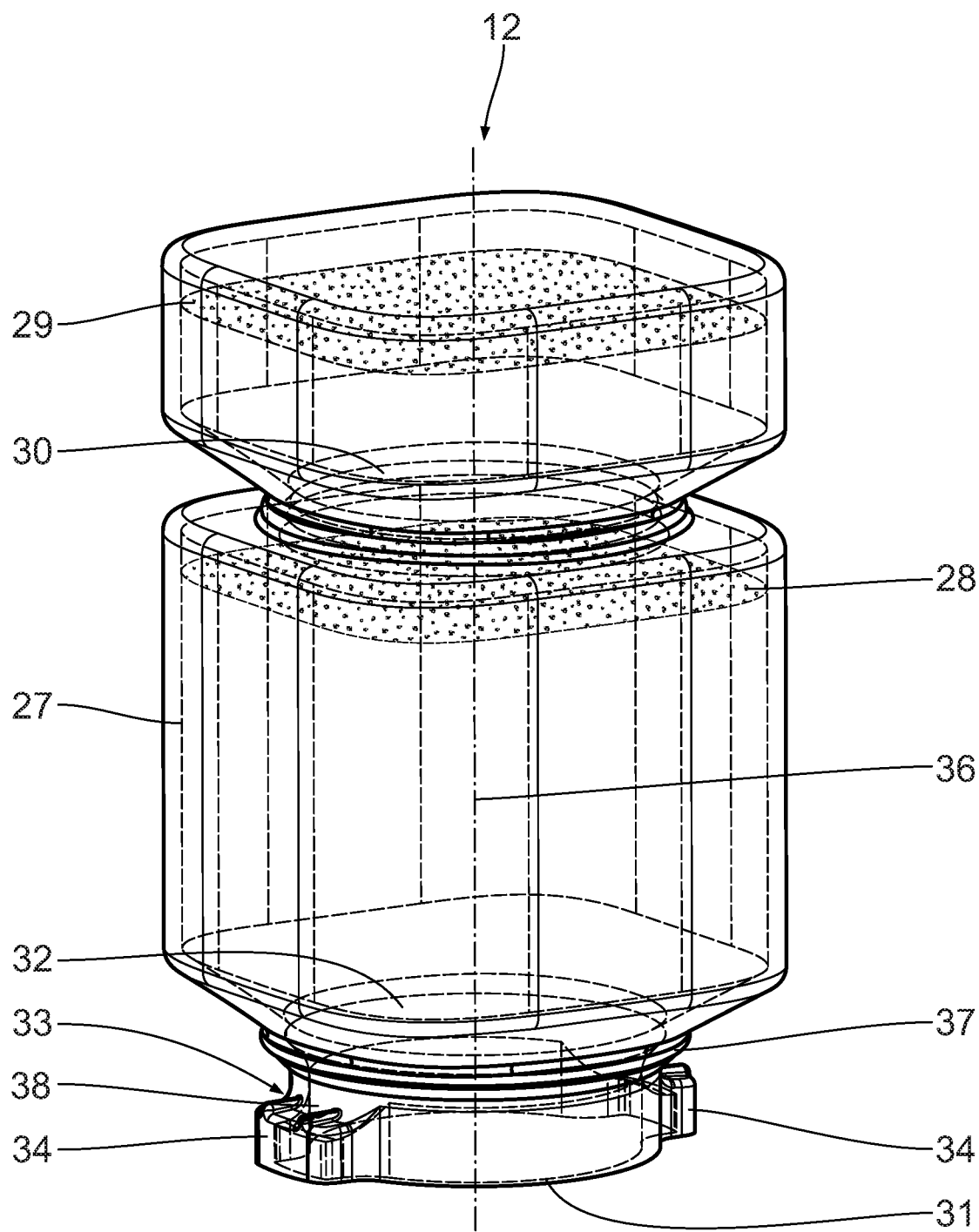
FIG. 4 shows a perspective view of the cleaning unit in FIG. 1, wherein the cleaning unit is configured as a cleaning cartridge with a chamber and a cleaning composition arranged therein.

In FIG. 2 and FIG. 3, the cleaning combination 2 is shown in an open position. The receiving means 33 is arranged in the receiving opening 22. In particular, the cylindrical connecting portion 35 penetrates the receiving opening 22.

The axis of rotation 36 is oriented vertically. The cleaning unit 12 rests via the abutment collar 37 on the circular-arc-shaped bar portions 25 of the rack bars 17 configured as formfit elements 21. The counter-formfit-locking elements 34 are arranged in a vertical direction below the formfit elements 21. The cleaning unit 12 is arranged on the receiving means 13 so as to be rotatable about the axis of rotation 36. The cleaning unit 12 can be pivoted about the axis of rotation 36 for displacing the cleaning combination 2 into a locked position not shown. In the locked position, the counter-formfit-locking elements 34 of the cleaning unit 12 engage formfittingly behind the formfit means 21 of the cleaning insert 11, and the dispensing opening 31 is arranged on the lower side of the chamber 27.

The operating principle of the cooking appliance 1 and the cleaning combination 2 with the cleaning insert 11 and the cleaning unit 12 is as follows:

The cooking appliance 1 is used to heat food arranged in the cooking space 4. The user can control the cooking process by input via the user interface 7. In particular, the control device connected to the user interface 7 regulates the cooking temperature prevailing in the cooking space 4.

During the cooking process, the cooking chamber 3 and carrier 10 for the food to be cooked become progressively soiled by deposits resulting, for example, from evaporated or splashed or overflowing ingredients of the food to be cooked. For hygienic operation of the cooking appliance 1, it is necessary to remove these deposits at regular intervals. For this purpose, the procedure for cleaning the cooking chamber 3 described below is carried out:

The cleaning insert 11 and the cleaning unit 12 are provided. The first sealing layer 32 closes a region of the chamber 27 in which the cleaning composition 28, 29 is arranged.

The cleaning unit 12 is attached to the cleaning insert 11. For this purpose, the cylindrical connecting portion 35 is inserted into the receiving opening 22. The abutment collar 37 contacts the arc-shaped bar portions 25. The counter-formfit-locking elements 34 point in the direction of the longitudinal extension of the straight bar portions 26. The cleaning combination 2 is in the open position.

The cleaning unit 12 is rotated by 90° about the axis of rotation 36. The counter-formfit-locking elements 34 engage behind the formfit means 21 which are present in the form of the circular-arc-shaped bar portions 25. The cleaning unit 12 is fixed to the cleaning insert 11. In particular, the cleaning unit 12 is fixed completely in terms of translation relative to the cleaning insert 11. The cleaning combination 2 is in the locked position.

The cleaning combination 2 is inserted into the cooking space 4. In particular, the cleaning combination 2 is attached to the supporting rails 9 of the cooking appliance 1 by means of the two supporting rail engagements 16. Preferably, the fastening of the cleaning combination 2 is performed to the supporting rails 9 that are central in the vertical direction. This ensures that the cleaning unit 12 is arranged substantially centrally in the cooking space 4. Alternatively, the cleaning unit 12 can also be placed in a cleaning insert 11 already inserted in the cooking space 4.

The cooking chamber door 6 is closed. The user selects a cleaning program via the user interface 7. The cleaning program is executed by the control device.

In a pre-purging phase, the cooking space 4 is heated to a pre-purging temperature $T_V$ of 50° C. Water is discharged into the cooking space 4 via an inlet not shown. In particular, the water is dispensed onto the fan wheel of a recirculating air fan. The fan wheel is driven in rotation by means of a fan motor not shown and the water dispensed to it is thus distributed particularly evenly in the cooking space 4.

Gross contamination is thereby loosened from the cooking chamber 3 and from the carrier 10 for the food to be cooked. The dirty water is collected on the bottom wall of the cooking chamber 3 and drained from the cooking space 4 via a drain opening 39. A fluid system, not shown, for treating and conveying liquids and gases is connected to the drain opening 39. The purging water is circulated several times through the cooking space 4 via a line outside the cooking space 4, which is a component of the fluid system. The contaminated purging water is then pumped out, thus terminating the pre-purging phase.

In a purging phase, the cooking space 4 is heated to 65° C. The first sealing layer 32 melts. The first cleaning ingredient 28 of the cleaning composition is thus released and falls out of the cleaning unit 12 by gravity through the dispensing opening 31. Fresh water is discharged onto the rotating fan wheel of the recirculating air fan and spreads into the cooking space 4. The first ingredient 28 is dissolved in the fresh water. The first ingredient 28 forms a cleaning liquor together with the fresh water. The cleaning liquor enters the drain opening 39 and is then circulated several times through the cooking space 4. In doing so, even stubborn deposits are loosened from the cooking chamber 3 and the carrier 10 for the food to be cooked. The contaminated cleaning liquor is finally pumped out.

In a subsequent intermediate purging phase, the cooking space 4 is flushed with fresh water. As a result, residues of the cleaning composition 28, 29 still remaining in the cooking space 4, in particular the cleaning liquor, are completely rinsed out of the cooking appliance 1, in particular the cooking space 4. An adverse effect on subsequent cleaning phases, in particular due to residues that could cause an adverse effect on the pH value, is thus reliably avoided. In particular, the alkaline cleaning liquor is prevented from weakening the descaling effect of the acidic descaling solution subsequently introduced into the cooking space 4. For this purpose, fresh water is dispensed to the rotating fan wheel and distributed in the cooking space 4. The fresh water is circulated several times through the cooking space 4, in particular through the drain opening 39 and via the fan wheel. The fresh water is pumped out. This process is repeated three times. The intermediate purging phase is completed.

In a subsequent decalcification phase, the cooking space 4 is heated to a decalcification temperature $T_E$ of 95°. The second sealing layer 30, which encloses the second ingredient 29 of the cleaning composition together with the chamber 27, melts. The second ingredient 29 falls out of the cleaning unit 12 by gravity through the dispensing opening 31. Fresh water is distributed into the cooking space 4 via the rotating fan wheel. The fresh water mixes with the second ingredient 29 and forms a descaling solution. The descaling solution is conducted to the drain opening 39 and circulated several times over the cooking space 4, in particular through the drain opening 39, and via the rotating fan wheel. Lime deposits on the cooking chamber 3, the carrier 10 for the food to be cooked and in the fluid system downstream of the drain opening 39 are dissolved. The calcareous liquid is pumped out via the drain opening 39. The decalcification phase is completed.

A post-purging phase is initiated. The post-purging phase corresponds to the intermediate purging phase. Residues of the cleaning composition 28, 29, in particular of the descaling solution, are completely rinsed out of the cooking appliance 1, in particular the cooking space 4, as a result. After completion of the post-purging phase, the cleaning process is finished.

The cleaning combination 2 is removed from the cooking space 4. The cleaning unit 12 is rotated by 90° against the axis of rotation 36. The formfitting between the receiving means 13 and the counter-receiving means 33 is removed. The cleaning unit 12 can be removed from the cleaning insert 11.

The cleaning insert 11 can be used as a conventional baking rack for bearing food to be cooked.

The design of the cleaning insert 11 with the receiving means 13 for receiving the cleaning unit 12 in a reversibly fixed manner reliably ensures that the cleaning unit 12 can be arranged at a predetermined central or eccentric position within the cooking space 4. The distribution of the cleaning composition 28, 29 in the cooking space 4, which is necessary for the cleaning success, is thus ensured in a reliable manner. In particular, it is ensured that the cleaning composition 28, 29 can be completely discharged from the cleaning unit 12, in particular from the chamber 27, and fed into the purging process. By configuring the cleaning unit 12 with the chamber 27 and the counter-receiving means 33, the cleaning unit 12 can be reliably connected to the cleaning insert 11 in such a way that it cannot be lost. A displacement of the cleaning unit 12 within the cooking space 4 during the cleaning process, in particular due to the circulation of cooling air or liquid, can be avoided. The dispensing of the cleaning composition 28, 29 is performed in a particularly reliable manner, making the cleaning process robust and efficient.

What is claimed is:

1. A method for cleaning a cooking chamber of a cooking appliance, comprising the steps of:
providing a cleaning combination for the cooking appliance outside a cooking space, wherein the cleaning combination comprises:
a cleaning unit; and
a cleaning insert for removable arrangement in the cooking space of the cooking appliance, the cleaning unit comprising:
a receiving means for receiving a cleaning unit with a cleaning composition in a reversibly fixed manner; and
a supporting body connected to the receiving means, for positioning the receiving means relative to the cooking space,
wherein the supporting body comprises a carrier for food to be cooked, and
wherein the cleaning unit comprises:
a cleaning composition;
a chamber in which the cleaning composition is arranged, the chamber having a dispensing opening for dispensing the cleaning composition into the cooking space of the cooking appliance; and
a counter-receiving means for reversibly fixing the cleaning unit to the cleaning insert,
wherein the cleaning composition comprises at least two cleaning ingredients,
connecting the cleaning unit to the cleaning insert by attaching the counter-receiving means to the receiving means wherein connecting the cleaning unit to the cleaning insert comprises forming a formfit connection configured as at least one of a bayonet lock, a snap-in connection and a latch connection,
positioning the cleaning insert with the cleaning unit in the cooking space,
dispensing the cleaning composition through the dispensing opening into the cooking space for cleaning the cooking chamber, and
removing the cleaning insert with the chamber from the cooking space.

2. The method according to claim 1, further comprising temperature-induced opening of two sealing layers of the cleaning unit to release two different cleaning ingredients of the cleaning composition at different activation temperatures, respectively.

3. A cleaning combination for a cooking appliance, the cleaning combination comprising:
a cleaning unit; and
a cleaning insert for removable arrangement in a cooking space of the cooking appliance, the cleaning insert comprising:
a receiving means for receiving the cleaning unit with a cleaning composition in a reversibly fixed manner wherein the receiving means has a formfit element for a formfit connection to the cleaning unit, the formfit connection being configured as to form at least one of a bayonet lock, a snap-in connection and a latch connection with the cleaning unit; and
a supporting body connected to the receiving means, for positioning the receiving means relative to the cooking space;
wherein the supporting body comprises a carrier for food to be cooked; and
wherein the cleaning unit comprises:
a cleaning composition;
a chamber in which the cleaning composition is arranged, having a dispensing opening for dispensing the cleaning composition into the cooking space of the cooking appliance; and
a counter-receiving means for reversibly fixing the cleaning unit to the cleaning insert, wherein the cleaning composition comprises at least two cleaning ingredients.

4. The cleaning combination according to claim 3, wherein the counter-receiving means comprises a counter-formfit-locking element for a formfit connection to the cleaning insert.

5. The cleaning combination according to claim 3, wherein the counter-receiving means is connected to the chamber in one piece.

6. The cleaning combination according to claim 3, wherein the cleaning unit attached to the cleaning insert penetrates the supporting body.

7. The cleaning combination according to claim 3, wherein the cleaning unit is arranged on the cleaning insert in such a way that the cleaning composition can be dispensed from the chamber by gravity through the dispensing opening.

8. The cleaning combination according to claim 3, wherein:
the receiving means comprises a formfit element configured to formfit connect to the counter receiving means;
the counter-receiving means comprises a counter-formfit-locking element configured to formfit connect to the form-fit element of the cleaning insert; and
the formfit element and the counter-formfit-locking element define a formfit connection configured as at least one of a bayonet lock, a snap-in connection and a latch connection.

9. A cleaning insert for removable arrangement in a cooking space of a cooking appliance, the cleaning insert comprising:
a receiving means for receiving a cleaning unit with a cleaning composition in a reversibly fixed manner; and
a supporting body connected to the receiving means, for positioning the receiving means relative to the cooking space,
wherein the supporting body comprises a carrier for food to be cooked, and
wherein the receiving means comprises a formfit element for a formfit connection to the cleaning unit, the formfit connection being configured to form at least one of a bayonet lock, a snap-in connection and a latch connection with the cleaning unit.

10. The cleaning insert according to claim 9, wherein the supporting body has a rail engagement for being connected to a supporting rail of the cooking appliance.

11. The cleaning insert according to claim 9, wherein the receiving means is arranged in a central region of the carrier for the food to be cooked.

12. The cleaning insert according to claim 11, wherein the receiving means is arranged at a distance from an outer contour of the supporting body of at least 50 mm.

13. The cleaning insert according to claim 9, wherein the carrier for the food to be cooked is a baking rack.

14. The cleaning insert according to claim 13, wherein the receiving means is configured by at least one rack bar of a baking rack.

\* \* \* \* \*